(12) United States Patent
Tone

(10) Patent No.: US 10,277,872 B2
(45) Date of Patent: *Apr. 30, 2019

(54) DISPLAY APPARATUS, AND CONTROL METHOD FOR DISPLAY APPARATUS

(71) Applicant: SEIKO EPSON CORPORATION, Tokyo (JP)

(72) Inventor: Takehiko Tone, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,698

(22) Filed: Jan. 10, 2017

(65) Prior Publication Data
US 2017/0208299 A1 Jul. 20, 2017

(30) Foreign Application Priority Data

Jan. 18, 2016 (JP) ................................. 2016-007078

(51) Int. Cl.
*H04N 9/31* (2006.01)
*G06F 9/4401* (2018.01)

(52) U.S. Cl.
CPC ......... *H04N 9/3155* (2013.01); *H04N 9/3179* (2013.01); *G06F 9/4401* (2013.01)

(58) Field of Classification Search
CPC ........................... H04N 9/3155; H04N 9/3179
USPC .......................................................... 345/87
See application file for complete search history.

(56) References Cited

U.S. PATENT DOCUMENTS

| 7,081,815 | B2* | 7/2006 | Runyon | E05G 1/10 169/51 |
| 7,441,903 | B2* | 10/2008 | Kim | G03B 21/16 348/748 |
| 8,777,423 | B2* | 7/2014 | Okada | G03B 21/20 353/85 |
| 9,310,670 | B2* | 4/2016 | Naitou | G03B 21/2053 |
| 2007/0195208 | A1 | 8/2007 | Miyazawa et al. | |
| 2009/0015799 | A1* | 1/2009 | Luciano | G03B 21/10 353/79 |
| 2009/0219493 | A1* | 9/2009 | Okubo | H04N 9/3129 353/85 |
| 2014/0039719 | A1* | 2/2014 | Morselli | A01B 69/008 701/1 |
| 2015/0215592 | A1 | 7/2015 | Tone et al. | |

(Continued)

FOREIGN PATENT DOCUMENTS

| JP | 2006-243324 A | 9/2006 |
| JP | 2015-158659 A | 9/2015 |

*Primary Examiner* — Fred Tzeng
(74) *Attorney, Agent, or Firm* — Oliff PLC

(57) ABSTRACT

A projector includes a light source portion and a light modulation device which modulates light from the light source portion. The projector includes an entire control processor which controls an operation of the projector by executing an OS, and a video-output system processor which is operated in parallel to the entire control processor and controls a light source of the light source portion and the light modulation device. The projector includes a nonvolatile storage unit which stores control data processed by the video-output system processor. The entire control processor transmits the control data stored in the nonvolatile storage unit to the video-output system processor before activating the OS.

10 Claims, 5 Drawing Sheets

(56) References Cited

U.S. PATENT DOCUMENTS

2017/0076556 A1* 3/2017 Walker .................... G07F 17/32
2017/0134537 A1* 5/2017 O'Mahony ............ G07C 5/008

* cited by examiner

DISPLAY APPARATUS, AND CONTROL METHOD FOR DISPLAY APPARATUS

The entire disclosure of Japanese Patent Application No. 2016-007078, filed Jan. 18, 2016 is expressly incorporated by reference herein.

BACKGROUND

1. Technical Field

The present invention relates to a display apparatus, and a control method for the display apparatus.

2. Related Art

In the related art, as a display apparatus, there is a display apparatus including a plurality of processors (refer to JP-A-2015-158659). JP-A-2015-158659 discloses a projector including an entire control processor which controls a display apparatus, and a video-output system processor which performs processes related to a video. In the projector disclosed in JP-A-2015-158659, if a power source is turned on, the entire control processor is activated, and then activates the video-processing system processor.

Generally, it is known that, if a power source of a display apparatus is turned on, it takes time to operate a light emission unit or the like for displaying a video. Electronic equipment including the display apparatus typically executes a basic control program for controlling the entire apparatus, for example, an operating system. Thus, when a power source of the display apparatus is turned on, the time for activating the basic control program is also necessary. Therefore, there is a problem in that it takes time until display is started after the power source is turned on.

In light of this problem, the projector disclosed in JP-A-2015-158659 has a configuration in which a video-processing system processor reads a parameter required for processing in the video-processing system processor from a storage unit. According to this configuration, the video-processing system processor can perform a process without waiting for the entire control processor to be activated. However, in order for each of the entire control processor and the video-output system processor to access the storage unit, it is necessary to efficiently perform matching management of data such as a parameter stored in the storage unit or management of access to the storage unit.

SUMMARY

An advantage of some aspects of the invention is to provide a display apparatus capable of reducing the time until a video can be displayed after the display apparatus is activated with a simple configuration, and a control method for the display apparatus.

An aspect of the invention is directed to a display apparatus including a light source; a modulation device that modulates light from the light source; a first processor that controls an operation of the display apparatus by executing an operating system; a second processor that is operated in parallel to the first processor, and controls the light source and the modulation device; and a storage unit that stores control data processed by the second processor, in which the first processor transmits the control data stored in the storage unit to the second processor before activating the operating system.

According to the aspect of the invention, the second processor can perform a process based on the control data without waiting for the first processor controlling an operation of the display apparatus to complete activation of the operating system. Thus, it is possible to reduce the time until a video can be displayed after a display apparatus is activated with a simple configuration without needing to change a configuration of a storage unit storing data.

Another aspect of the invention is directed to the display apparatus in which the second processor controls the light source and the modulation device on the basis of the control data transmitted from the first processor in parallel to an operation of the first processor activating the operating system.

According to the aspect of the invention, since the second processor can perform an operation of controlling the light source and the modulation device while the first processor activates the operating system, it is possible to more efficiently reduce the time until a video can be displayed after the display apparatus is activated.

Another aspect of the invention is directed to the display apparatus in which the second processor performs light source preparation for causing the light source to emit light, and causes the light source to emit light after the light source preparation is completed, in parallel to an operation of the first processor activating the operating system.

According to the aspect of the invention, since the second processor can perform an operation of light source preparation required to light the light source while the first processor activates the operating system, it is possible to more efficiently reduce the time until a video can be displayed after the display apparatus is activated.

Another aspect of the invention is directed to the display apparatus in which the first processor transmits an instruction for light source preparation for causing the light source to emit light to the second processor before activating the operating system, and the second processor performs the light source preparation for causing the light source to emit light on the basis of the instruction transmitted from the first processor, and causes the light source to emit light after the light source preparation is completed.

According to the aspect of the invention, the second processor can perform an operation of light source preparation required to light the light source by the first processor transmitting an instruction. Thus, in a configuration in which the first processor controls the second processor, it is possible to more efficiently reduce the time until a video can be displayed after the display apparatus is activated.

Another aspect of the invention is directed to the display apparatus in which the light source is configured to include a discharge tube, and a stoppage period in which some functions of the first processor are stopped in a period of the second processor lighting the discharge tube of the light source is set in the first processor, and the stoppage period overlaps a period of performing a process of activating the operating system.

According to the aspect of the invention, some operations of the first processor are stopped in a case where the operations of the first processor are required to be stopped when the discharge tube is lit. A period of stopping the operations overlaps a period of activating the operating system, and thus it is possible to more efficiently reduce the time until a video can be displayed after the display apparatus is activated.

Another aspect of the invention is directed to the display apparatus in which the control data includes image data, and setting data related to display settings of the image data, and the second processor displays an image based on the image data included in the control data transmitted from the first processor according to display settings in the setting data in parallel to an operation of the first processor activating the operating system.

According to the aspect of the invention, the second processor can perform a process including setting for displaying a video while the first processor activates the operating system, and thus it is possible to more efficiently reduce the time until a video can be displayed after the display apparatus is activated.

Another aspect of the invention is directed to the display apparatus in which the second processor displays an image based on the image data included in the control data transmitted from the first processor before the light source starts to emit light or after the light source starts to emit light.

According to the aspect of the invention, the second processor displays an image before the light source starts to emit light, or displays an image after the light source starts to emit light. Thus, it is possible to rapidly display an image or to display an image after a lighting state of the light source is stabilized.

Another aspect of the invention is directed to the display apparatus which further includes a shutter that blocks light modulated by the modulation device; and a shutter driving unit that drives the shutter, in which the first processor controls the shutter driving unit to open the shutter, and the second processor causes the light source to emit light after the shutter is opened under the control of the first processor.

According to the aspect of the invention, the first processor adjusts a timing of performing an operation of opening the shutter so as to reduce the waiting time, and thus it is possible to reduce the time until a video can be displayed after the display apparatus is activated.

Another aspect of the invention is directed to the display apparatus in which the first processor controls the shutter driving unit to open the shutter before activating the operating system.

According to the aspect of the invention, the shutter can be moved while the first processor activates the operating system. Thus, it is possible to reduce the waiting time until an operation of opening the shutter is completed, or the waiting time until the operating system is activated. Therefore, it is possible to more efficiently reduce the time until a video can be displayed after the display apparatus is activated.

Another aspect of the invention is directed to a control method for a display apparatus including a light source, and a modulation device that modulates light from the light source, the control method including causing a first processor that controls an operation of the display apparatus by executing an operating system and a second processor that is operated in parallel to the first processor and controls the light source and the modulation device, to be operated in parallel to each other; and causing the first processor to transmit control data to be processed by the second processor from a storage unit to the second processor before activating the operating system.

According to the aspect of the invention, the second processor can perform a process based on the control data without waiting for the first processor controlling an operation of the display apparatus to complete activation of the operating system. Thus, it is possible to reduce the time until a video can be displayed after a display apparatus is activated with a simple configuration without needing to change a configuration of a storage unit storing data.

The invention may be realized in various aspects other than the above-described display apparatus and control method for a display apparatus. For example, in order to realize the control method for a display apparatus, the invention may be realized as a program executed by the first processor and/or the second processor. The invention may be realized in aspects such as a recording medium recording the program, a server apparatus transmitting the program, a transmitting medium transmitting the programs and a data signal in which the program is embodied in a carrier wave.

BRIEF DESCRIPTION OF THE DRAWINGS

The invention will be described with reference to the accompanying drawings, wherein like numbers reference like elements.

FIGS. 2A and 2B are a flowchart illustrating an operation of a projector according to a first embodiment, in which FIG. 2A illustrates an operation of an entire control processor, and FIG. 2B illustrates an operation of a video-output system processor.

FIGS. 3A and 3B are a flowchart illustrating an operation of a projector according to a second embodiment, in which FIG. 3A illustrates an operation of an entire control processor, and FIG. 3B illustrates an operation of a video-output system processor.

FIGS. 5A and 5B are a flowchart illustrating an operation of the projector according to the third embodiment, in which FIG. 5A illustrates an operation of an entire control processor, and FIG. 5B illustrates an operation of a video-output system processor.

DESCRIPTION OF EXEMPLARY EMBODIMENTS

First Embodiment

Figure 1:
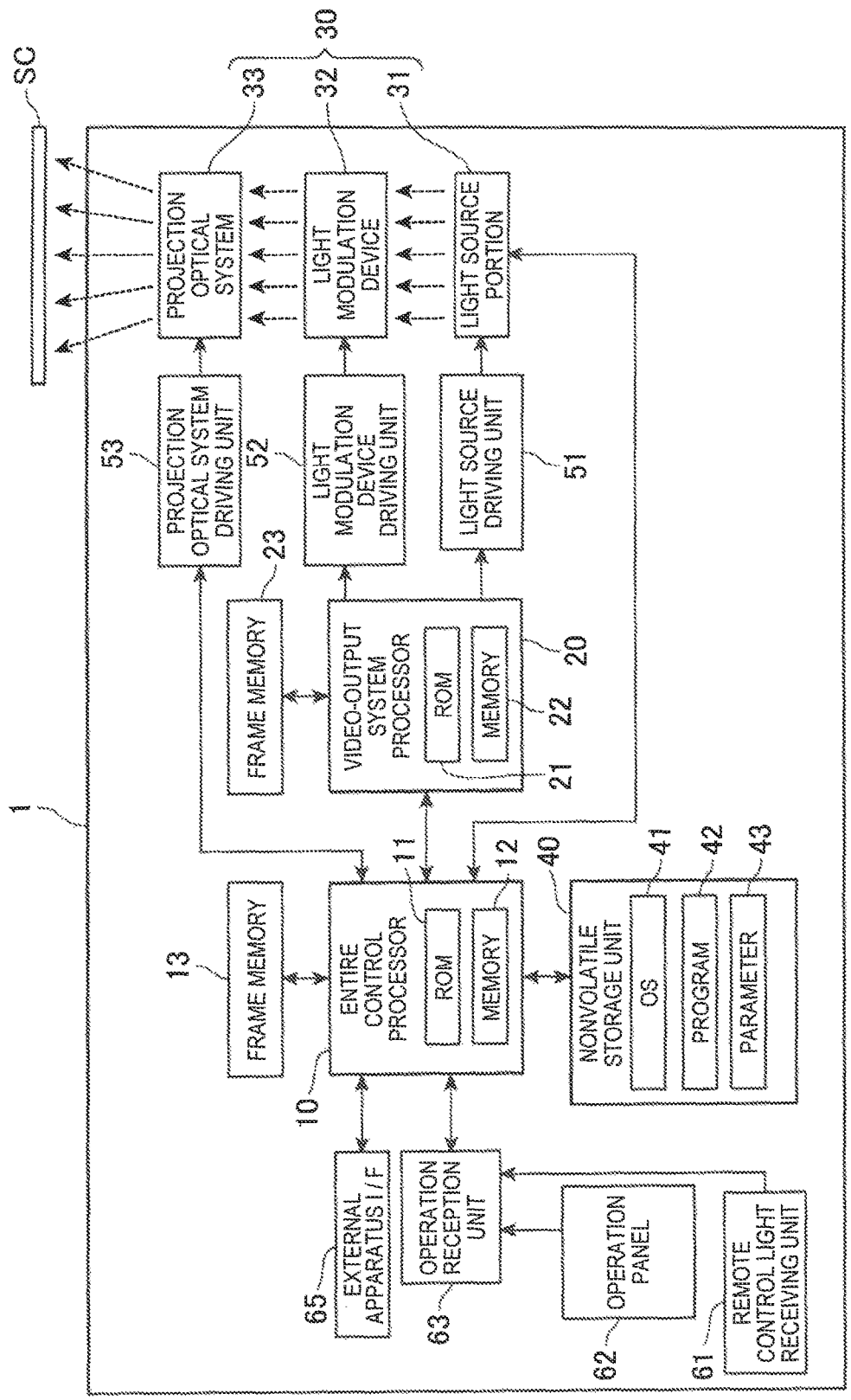
FIG. 1 is a functional block diagram of a projector.

FIG. 1 is a functional block diagram of a projector 1 according to a first embodiment to which the invention is applied.

The projector 1 (display apparatus) projects (displays), on a screen SC, an image based on image data which is supplied from an externally connected image supply apparatus (not illustrated) or image data stored in a nonvolatile storage unit 40 (storage unit) which will be described later.

The projector 1 may project an image on the basis of still image data on the screen SC, and may display an image on the basis of moving image (video) data. A 2D (plane) image may be projected, and a 3D (stereoscopic) image may be projected. In the following description, an image projected by the projector 1 is referred to as a video regardless of the type of original image data.

Regarding an installation state of the projector 1, the projector 1 may be installed on a floor in front of the screen SC, or may be suspended from a ceiling. In a case where the projector 1 is installed on a floor, the projector 1 may be installed on a table provided on the floor. A projection location may be an object which is not uniformly flat, such as a building, and may be one having a flat projection surface, such as the screen SC or a wall surface of a building. In the present embodiment, a case of projecting an image onto the planar screen SC will be exemplified.

The projector 1 includes an entire control processor 10, and a video-output system processor 20 which performs a process related to video output under the control of the entire control processor 10. The entire control processor 10 corresponds to a first processor, and the video-output system processor 20 corresponds to a second processor.

The entire control processor 10 is connected to respective constituent elements such as a frame memory 13, the video-output system processor 20, the nonvolatile storage unit 40, an operation reception unit 63, and an external apparatus interface (I/F) 65. The entire control processor 10 transmits and receives data to and from the respective constituent elements, so as to control the respective constituent elements of the projector 1. The video-output system processor 20 is connected to a frame memory 23, a light source driving unit 51, a light modulation device driving unit 52, and a projection optical system driving unit 53. The video-output system processor 20 transmits and receives data to and from the respective constituent elements, so as to output a video from the projector 1.

The entire control processor 10 and the video-output system processor 20 can be operated in parallel. Here, parallel operation indicates that both of the entire control processor 10 and the video-output system processor 20 can be operated. During the operation, the entire control processor 10 and the video-output system processor 20 may perform mutually related processes, each thereof may perform a non-related process, and the content of an operation is not limited. Timings at which the entire control processor 10 and the video-output system processor 20 start operations and finish operations may be different from each other, and these timings are not required to be synchronized with each other. Timings at which the entire control processor 10 and the video-output system processor 20 start operations and finish operations may be synchronized with each other.

The external apparatus I/F 65 is connected to an external image supply apparatus. The image supply apparatus is, for example, a video reproduction apparatus, a digital versatile disk (DVD) reproduction apparatus, a television tuner apparatus, a video output apparatus of a video game apparatus or the like, or a personal computer.

The external apparatus I/F 65 includes a connector for connection of a cable, and an I/F circuit (neither thereof illustrated), and receives an image signal with a predetermined transmission format, supplied from the image supply apparatus via the cable. The external apparatus I/F 65 may include a wireless communication interface, and may receive image data through wireless communication with the image supply apparatus. The external apparatus I/F 65 outputs received image data format information of the received image data, a vertical synchronization signal, a horizontal synchronization signal, and the like to the entire control processor 10.

The projector 1 includes a remote control light receiving unit 61 which receives an infrared signal transmitted from a remote controller (not illustrated) used by a user. The remote control light receiving unit 61 is connected to the operation reception unit 63. The operation reception unit 63 decodes the infrared signal received by the remote control light receiving unit 61, generates operation data indicating the operation content on the remote controller, and outputs the operation data to the entire control processor 10.

The projector 1 includes an operation panel 62 provided with various operation keys and switches, and the operation panel 62 is connected to the operation reception unit 63. If an operation key displayed on the operation panel 62 is operated, the operation reception unit 63 outputs operation data corresponding to the operated key to the entire control processor 10.

In the present embodiment, at least one of the remote controller (not illustrated) and the operation panel 62 is provided with a power switch (not illustrated) which is an operator for giving an instruction for turning on and off a power source of the projector 1. In a case where an operation on the power switch is detected in a stoppage state of the projector 1, that is, a power-off state, the operation reception unit 63 performs interruption input of control data indicating that the power-on operation has been received on the entire control processor 10.

The operation panel 62 may be provided with an indicator lamp (not illustrated) indicating an operation state of the projector 1. In this case, the operation reception unit 63 causes the indicator lamp of the operation panel 62 to be lit or to blink under the control of the entire control processor 10.

The projector 1 includes a display unit 30 which forms an optical images and projects (displays) an image onto the screen SC. The display unit 30 is provided with a light source portion 31 (light source), a light modulation device 32 (modulation device), and a projection optical system 33.

The light source portion 31 includes a discharge tube light source such as a xenon lamp or an ultra-high pressure mercury lamp, or a solid-state light source such as a light emitting diode (LED) or a laser light source. The light source portion 31 may include a reflector and an auxiliary reflector which guide light emitted from the light source to the light modulation device 32. The light source portion 31 may be provided with a lens group and a polarization plate (not illustrated) for increasing optical characteristics of projection light, or a light control element (not illustrated) which reduces an amount of light emitted from the light source on a path reaching the light modulation device 32.

The light source portion 31 is driven by the light source driving unit 51. In a case where the light source portion 31 is configured to include a discharge tube light source, the light source driving unit 51 includes, for example, an igniter which lights the light source, and a control circuit which supplies a current after the light source is lit.

In this case, operations of the light source driving unit 51 lighting the light source of the light source portion 31 are roughly classified into the following steps (1) to (3). (1) High voltages are generated by the igniter, the generated high voltages are made to overlap each other between lamp terminals so as to cause insulation breakdown, and thus a discharge path is formed. (2) A rush current is made to flow through the lamp terminals, and thus arc discharge occurs. (3) The supply of a current to the lamp is made to transition to a stable lighting state, and thus the arc discharge is maintained to be stable. Operations of the light source driving unit 51 in the steps (1) to (3), and the supply of power to the light source portion 31 after the light source portion 31 is lit, are controlled by the video-output system processor 20.

In a case where the light source portion 31 is configured to include a solid-state light source, the light source driving unit 51 includes, for example, a current circuit which outputs a drive current to the solid-state light source, and a PWM control circuit which controls a frequency or a ratio (ON duty) between ON and OFF periods of a pulse current which is output to the solid-state light source. In this case, the light source driving unit 51 starts PWM control under the control of the video-output system processor 20, sets a frequency and an ON duty of a pulse current which is output to the light source portion 31, and supplies the pulse current to the light source of the light source portion 31. A frequency and an ON duty of a pulse current output from the light source driving unit 51, and output starting and stopping of the pulse current are controlled by the video-output system processor 20.

The light source portion 31 includes an air-cooling fan (not illustrated). The air-cooling fan of the light source portion 31 cools a discharge tube light source or a solid-state light source. An air-cooling fan which cools a circuit portion supplying power to the light source may be provided. The light source portion 31 may be provided with a light source cooled by the air-cooling fan, or a temperature sensor detecting the temperature of the circuit portion.

The light modulation device 32 modulates light emitted from the light source portion 31 so as to generate image light, and outputs the image light to the projection optical system 33. The light modulation device 32 is formed of, for example, three transmissive liquid crystal panels or three reflective liquid crystal panels corresponding to three primary colors such as RGB. In this case, light from the light source portion 31 is split into three color light beams such as RGB, and the respective color light beams are incident to the corresponding liquid crystal panels. Each of the three liquid crystal panels draws an image under the control of the light modulation device driving unit 52, and then generates image light. The image light beams modulated by the respective liquid crystal panels are combined with each other by a combination optical system such as a cross dichroic prism so as to be emitted to the projection optical system 33.

The light modulation device 32 may be configured to modulate light emitted from the light source portion 31 by using a digital mirror device (DMD). For example, the light modulation device 32 includes a color wheel having color filters which convert light emitted from the light source portion 31 into three primary color light beams such as RGB, a DMD which modulates the light transmitted through the color wheel, and an optical system which guides light to the color wheel and the DMD. The light modulation device driving unit 52 draws an image on the DMD in synchronization with rotation of the color wheel. Light emitted from the light source portion 31 is transmitted through the color wheel so as to be converted into primary color light beams, and is guided to the projection optical system 33.

The projection optical system 33 includes a lens group which projects image light obtained through modulation in the light modulation device 32 toward the screen SC, and forms an image on the screen SC. The projection optical system 33 includes a zooming mechanism (not illustrated) which performs enlargement and reduction, and adjustment of a focal point of a projection image on the screen SC, a focus adjustment mechanism (not illustrated) which adjusts a focus, and an aperture adjustment mechanism (not illustrated) which adjusts an aperture of image light projected onto the screen SC. The zooming mechanism, the focus mechanism, and the aperture adjustment mechanism may be configured to be manually moved by a user. In the present embodiment, the projection optical system 33 includes motors (not illustrated) which drive the zooming mechanism, the focus mechanism, and the aperture adjustment mechanism. In this configuration, the projection optical system 33 may include a rotary encoder (not illustrated) which detects rotation positions of the motors. The projection optical system driving unit 53 operates the motors of the projection optical system 33 so as to adjust the zooming mechanism, the focus mechanism, and the aperture adjustment mechanism to predetermined states under the control of the entire control processor 10.

The nonvolatile storage unit 40 includes a semiconductor storage element such as a flash memory, a magnetic storage medium, or the like, and stores a program or data in a nonvolatile manner. The nonvolatile storage unit 40 stores programs for operating the entire control processor 10 and the video-output system processor 20, and various items of data processed by the entire control processor 10 and the video-output system processor 20. For example, the non-volatile storage unit 40 stores an operating system (OS) 41 which is a control program executed by the entire control processor 10. The nonvolatile storage unit 40 stores a program 42 which is executed on the OS 41, and parameters 43 (control data) regarding control performed by the video-output system processor 20. The nonvolatile storage unit 40 may store image data regarding an image which is projected onto the screen SC by the projector 1 under the control of the entire control processor 10. The nonvolatile storage unit 40 stores image data of an activation logo image displayed by the display unit 30 when the projector 1 is powered on to be activated.

The entire control processor 10 performs a calculation process by using a central processing unit (CPU) (not illustrated). The entire control processor 10 includes a nonvolatile read only memory (ROM) 11 which stores a control program executed by the CPU, and a memory 12 which temporarily stores data processed by the CPU.

The entire control processor 10 executes a basic control program stored in the ROM 11. The basic control program is, for example, a bootloader which is read and executed by the CPU of the entire control processor 10 when the power source of the projector 1 is turned on, and which initializes the entire control processor 10 and causes the entire control processor 10 to execute the OS 41. The entire control processor 10 executes the basic control program in the ROM 11, and loads the OS 41 in the nonvolatile storage unit 40 according to a function of the basic control program so as to develop the OS 41 on the memory 12 and to execute the OS 41. After activation of the OS 41 is completed, the entire control processor 10 executes, for example, the program 42 using a function of the OS 41, so as to control the respective constituent elements of the projector 1.

For example, after the OS 41 is activated, the entire control processor 10 outputs image data which is input from the external apparatus I/F 65, to the video-output system processor 20, and causes the display unit 30 to display an image based on the image data.

For example, the entire control processor 10 performs control of turning on and off rotation of the air-cooling fan on the basis of a detected value from the temperature sensor of the light source portion 31, and detects a rotation state of the air-cooling fan. The entire control processor 10 controls the motors of the projection optical system driving unit 53, and detects operation states of the motors.

The entire control processor 10 detects an operation on the remote control light receiving unit 61 or the operation panel 62 on the basis of data which is input from the operation reception unit 63. The entire control processor 10 displays a menu screen in response to this operation. Specifically, the entire control processor 10 performs a process of overlapping an on-screen display (OSD) image such as a menu image or a message image with currently displayed image data.

For example, the entire control processor 10 performs a process of converting image data to be displayed by the display unit 30, into image information indicating of a grayscale of each pixel of the liquid crystal panels or the DMD of the light modulation device 32, that is, image information for defining a drive voltage applied to each pixel. The image information processed here is developed on the frame memory 13. The entire control processor 10 performs an image adjustment process or the like for adjusting image quality such as brightness, contrast, sharpness, and a color tone, on the image information developed on the frame memory 13. The image information having undergone the image adjustment process or the like is output to the video-output system processor 20.

The entire control processor 10 outputs (transmits) the parameters 43 stored in the nonvolatile storage unit 40 to the video-output system processor 20. The parameters 43 are setting data used by the video-output system processor 20 in a process in which the video-output system processor 20 causes the display unit 30 to display an image.

The parameters 43 include, for example, setting information for turning on and off initial image display (also referred to as "logo image display") when the projector 1 is activated in response to a power-on operation. The parameters 43 may include installation state information (rear projection, vertical inversion, horizontal inversion, and the like) of the projector 1. The parameters 43 may include a correction parameter used to perform trapezoidal distortion correction on a projection image on the screen SC. The parameters 43 may include a parameter for setting a luminance value of the light source of the light source portion 31, or laser light source lighting number information indicating the number of laser light sources to be lit among a plurality of laser light sources provided in the light source portion 31 in a case where the light source portion 31 includes the plurality of laser light sources. The parameters 43 may include driving target light source type information indicating the type of light source driven by the light source driving unit 51 among light sources provided in the light source portion 31. The parameters 43 may include current value information for designating a current value which is output from the light source driving unit 51 when the light source portion 31 lights the light source. In a case where the light source portion 31 includes a plurality of light sources, the parameters 43 may include light source balance adjustment value information for adjusting an output balance of each light source. The parameters 43 may include image quality adjustment value information which is an image quality adjustment parameter suitable for the properties of the liquid crystal panel or the DMD of the light modulation device 32. The parameters 43 may include pixel deviation correction value information for correcting an alignment error occurring during assembling of the liquid crystal panels or the DMDs of the light modulation device 32. The parameters 43 may include color unevenness correction value information which is a parameter for correcting uneven colors in the liquid crystal panel or the DMD.

The entire control processor 10 transmits some or all of the parameters 43 to the video-output system processor 20. A timing of the entire control processor 10 transmitting the parameters 43 will be described later.

The video-output system processor 20 performs a calculation process by using a CPU (not illustrated). The video-output system processor 20 includes a nonvolatile ROM 21 which stores a control program executed by the CPU, and a memory 22 which temporarily stores data processed by the CPU.

If the entire control processor 10 cancels resetting of the video-output system processor 20, the video-output system processor 20 executes the control program stored in the ROM 21. The control program is a program which initializes the video-output system processor 20 so as to perform control or the like on the light source driving unit 51 and the light modulation device driving unit 52.

The video-output system processor 20 develops image information which is input from the entire control processor 10 on the frame memory 23. The video-output system processor 20 performs a scaling process, a trapezoidal distortion correction process, a color correction process, and the like on the image information. The video-output system processor 20 controls the light source driving unit 51 and controls the projection optical system driving unit 53.

In a case where the parameters 43 stored in the nonvolatile storage unit 40 are transmitted from the entire control processor 10 to the video-output system processor 20, the video-output system processor 20 operates according to the transmitted parameters.

For example, in a case where the content of the setting information for turning on and off initial image display indicates display ON, the video-output system processor 20 causes the display unit 30 to display a logo when the projector 1 is activated. The video-output system processor 20 sets necessity of vertical inversion or horizontal inversion of an image which is drawn on the light modulation device 32 by the light modulation device driving unit 52, on the basis of the installation state information (rear projection, vertical inversion, horizontal inversion, and the like) of the projector 1.

The video-output system processor 20 performs trapezoidal distortion correction on an image developed on the frame memory 23 on the basis of the trapezoidal distortion correction parameter. The video-output system processor 20 controls the light source driving unit 51 on the basis of parameters such as the parameter for setting a luminance value of the light source of the light source portion 31, the laser light source lighting number information, the driving target light source type information, the current value information, and the light source balance adjustment value information. Consequently, the light source portion 31 performs lighting under operation conditions according to the parameters.

The video-output system processor 20 corrects image information developed on the frame memory 23 on the basis of the image quality adjustment value information, the pixel deviation correction value information, the color unevenness correction value information, and the like, and controls the light modulation device driving unit 52 to draw an image on the light modulation device 32 according to the parameters.

The entire control processor 10 and the video-output system processor 20 may be formed of a microcomputer or a system on chip (SoC) into which the CPUs, the ROMs 11 and 21, and the memories 12 and 22 are integrated. There may be a configuration in which the entire control processor 10 is formed of the CPU, and the ROM 11 and the memory 12 are externally connected to the entire control processor 10. There may be a configuration in which the video-output system processor 20 is formed of the CPU, and the ROM 21 and the memory 22 are externally connected to the video-output system processor 20.

Figures 2A, 2B:
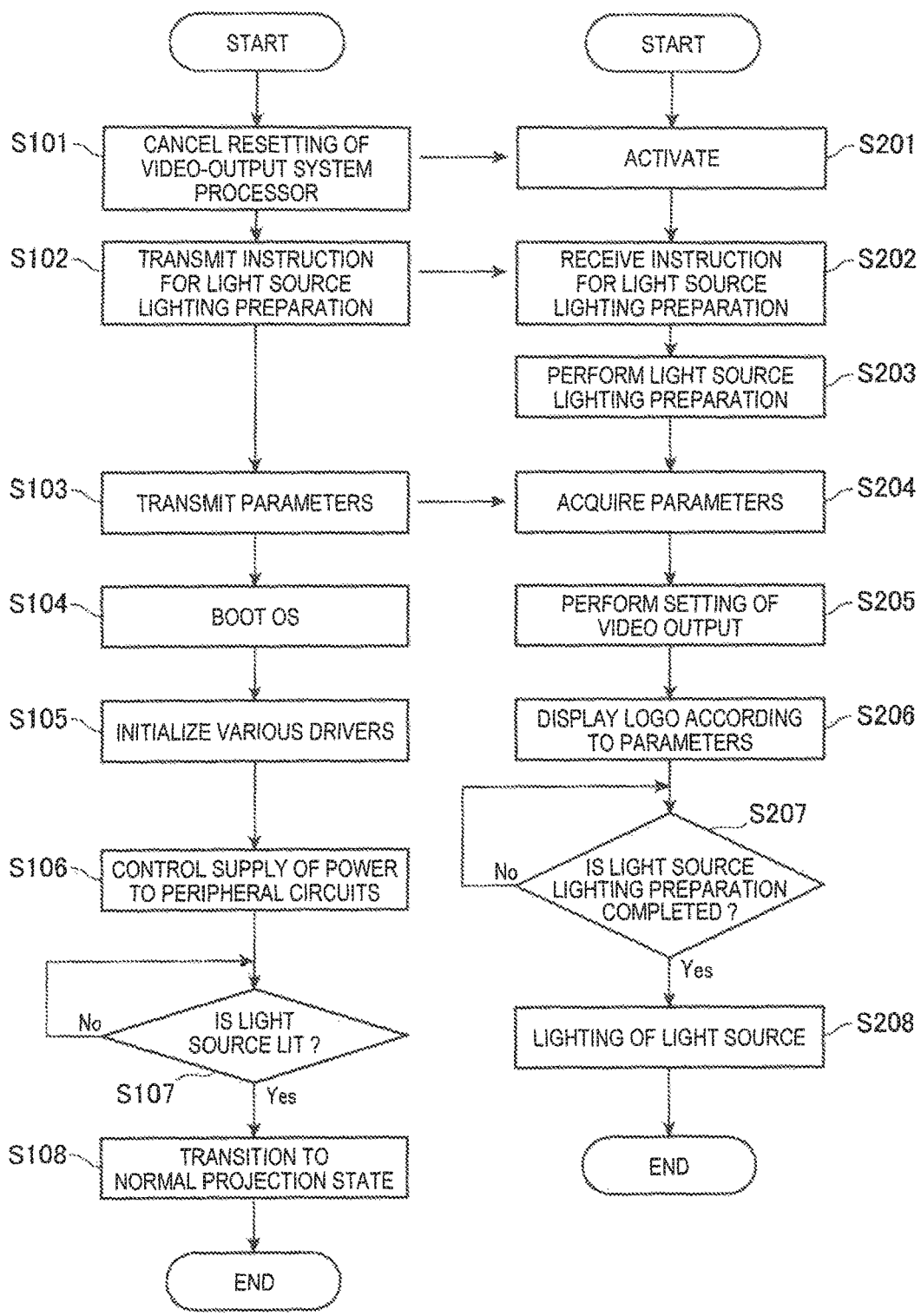

FIGS. 2A and 2B are flowcharts illustrating an operation of the projector 1, and illustrate a power-on sequence which is performed according to a power-on operation on the projector 1. FIG. 2A illustrates an operation of the entire control processor 10, and FIG. 2B illustrates an operation of the video-output system processor 20.

If an operation of turning on the power switch of the operation panel 62 is performed, the entire control processor 10 is activated to execute a boot program stored in the ROM 11, and cancels resetting of the video-output system processor 20 according to a function of the program (step S101).

If the resetting is canceled, the video-output system processor 20 is activated (step S201) to execute the control program stored in the ROM 21, and waits for instruction data to be input from the entire control processor 10.

The entire control processor 10 transmits an instruction for preparing for light source lighting to the video-output system processor 20 (step S102). The video-output system processor 20 receives the instruction for preparing for light source lighting, transmitted from the entire control processor 10 (step S202), and performs light source lighting preparation (light source preparation) which is a process for lighting the light source of the light source portion 31 (step S203). The light source lighting preparation is, specifically, a process for driving a circuit included in the light source driving unit 51 on the basis of a current value and a light source balance adjustment value during lighting of the light source.

Next, the entire control processor 10 reads the parameters 43 stored in the nonvolatile storage unit 40, and transmits the parameters 43 to the video-output system processor 20 (step S103). In other words, the entire control processor 10 copies the parameters 43 to the memory 12, and outputs the parameters 43 from the memory 12 to the video-output system processor 20. The video-output system processor 20 acquires the parameters 43 transmitted from the entire control processor 10, and stores the parameters 43 in the memory 22 (step S204).

In step S103, the entire control processor 10 transmits not only the parameters 43 acquired from the nonvolatile storage unit 40 but also logo image data displayed as an initial image to the video-output system processor 20. In step S204, the video-output system processor 20 acquires the logo image data along with the parameters.

The video-output system processor 20 controls the light source driving unit 51, the light modulation device driving unit 52, and the projection optical system driving unit 53 according to the acquired parameters, and performs various settings for displaying and outputting videos (step S205). The settings performed in step S205 include, for example, a process of writing initial image data (logo image data) into the frame memory 23 in a case where initial image display is turned on. The video-output system processor 20 develops an image based on the initial image data on the frame memory 23 so as to draw the image. The video-output system processor 20 performs conversion or correction on the image developed on the frame memory 23 on the basis of the installation state information, the trapezoidal distortion correction information, the pixel deviation correction value information, the color unevenness correction value information, and the like. The video-output system processor 20 may perform setting of a correction parameter for trapezoidal distortion correction on the image developed on the frame memory 23, setting related to an operation of the light source driving unit 51, and correction on image information developed on the frame memory 23.

The video-output system processor 20 causes the display unit 30 to display an image based on the logo image data acquired in step S204 (step S206). In step S206, the video-output system processor 20 develops the logo image data on the frame memory 23, and drives the light source driving unit 51 and the light modulation device driving unit 52 on the basis of the image on the frame memory 23. Here, the image developed on the frame memory 23 by the video-output system processor 20 is subjected to conversion and correction according to the parameters acquired by the video-output system processor 20.

The video-output system processor 20 determines whether or not the light source lighting preparation started in step S203 is completed, and the light source of the light source portion 31 can be lit (step S207). The video-output system processor 20 waits for the light source to be able to be lit (No in step S207). If the light source can be lit (Yes in step S207), the video-output system processor 20 lights the light source of the light source portion 31 (step S208).

On the other hand, after the parameters are transmitted to the video-output system processor 20 in step S103, the entire control processor 10 loads the OS 41 stored in the nonvolatile storage unit 40 and develops the OS 41 on the memory 12 so as to boot the OS 41 (step S104).

After the OS 41 is activated, the entire control processor 10 initializes a driver program of each constituent element which is a control target of the entire control processor 10 (step S105), and controls the supply of power to peripheral circuits (step S106).

The entire control processor 10 determines whether or not the light source portion 31 is lit (step S107). In a case where the light source portion 31 is not lit (No in step S107), the entire control processor 10 waits for the light source portion 31 to be lit by the video-output system processor 20. In a case where the light source portion 31 is lit (Yes in step S107), the entire control processor 10 transitions to a normal projection state (step S108), and finishes the activation process. Here, the normal projection state indicates a state of projecting an image based on an image signal.

In the flowchart illustrated in FIG. 2B, a logo image is displayed in step S206, and then the light source portion 31 is lit in step S208. In this case, the logo can be displayed at the time when image light is started to be projected onto the screen SC, and there is an advantage in that the logo can be rapidly displayed.

Here, the video-output system processor 20 may perform the operations in steps S207 and S208 so as to light the light source portion 31, and then may display the logo in step S206. In this case, an image can be clearly displayed from starting of display of the logo image.

The parameters acquired by the video-output system processor 20 from the entire control processor 10 are used without being limited to the activation process illustrated in FIG. 2B. In other words, after the activation process illustrated in FIGS. 2A and 2B is performed, the video-output system processor 20 also performs projection with the display unit 30 according to the parameters acquired in step S204 after the projector 1 transitions to a normal operation state. For example, the video-output system processor 20 also performs processes based on the above-described installation state information, trapezoidal distortion correction information, pixel deviation correction value information, color unevenness correction value information, and the like, in the normal operation state.

As described above, the projector 1 to which the invention is applied includes the light source portion 31, and the light modulation device 32 modulating light from the light source portion 31. The projector 1 includes the entire control processor 10 which executes the OS 41 so as to control an operation of the projector 1, and the video-output system processor 20 which is operated in parallel to the entire control processor 10 so as to control the light source portion 31 and the light modulation device 32. The projector 1 includes the nonvolatile storage unit 40 which stores the parameters 43 processed by the video-output system processor 20. The entire control processor 10 transmits the parameters 43 stored in the nonvolatile storage unit 40 to the video-output system processor 20 before activating (booting) the OS 41.

According to the configuration of the projector 1 and the control method for the projector 1, the video-output system processor 20 can perform processes based on the parameters 43 without waiting for the entire control processor 10 to complete activation of the OS 41. Consequently, it is possible to reduce the time until a video can be displayed after the projector 1 is activated by receiving a power-on operation in the operation reception unit 63. The invention can be realized with a simple configuration, for example, without requiring a change to configuration in which the video-output system processor 20 directly refers to the parameters 43 in the nonvolatile storage unit 40.

Along with an operation of the entire control processor 10 activating the OS 41, the video-output system processor 20 controls the light source portion 31 and the light modulation device 32 on the basis of the parameters transmitted from the entire control processor 10. Therefore, the video-output system processor 20 can perform an operation of controlling the light source driving unit 51 and the light modulation device driving unit 52 while the entire control processor 10 activates the OS 41. Thus, for example, it is possible to display a video within a short period of time after the projector 1 is activated compared with a case where the entire control processor 10 activates the OS 41 and then the video-output system processor 20 performs a process for displaying a logo.

Here, in the configuration in which the video-output system processor 20 performs control in parallel to an operation of the entire control processor 10 activating the OS 41, operations of the entire control processor 10 and the video-output system processor 20 are not necessarily required to be synchronized with each other. Specifically, this indicates that the video-output system processor 20 performs a process for controlling the light source portion 31 and the light modulation device 32 while the entire control processor 10 performs a process for activating the OS 41. Therefore, timings at which the entire control processor 10 and the video-output system processor 20 start and finish operations may be different from each other, and these timings are not required to be synchronized with each other. Timings at which the entire control processor 10 and the video-output system processor 20 start operations and finish operations may be synchronized with each other.

This is also the same for a case where the video-output system processor 20 performs light source lighting preparation for lighting the light source portion 31 in parallel to an operation of the entire control processor 10 activating the OS 41. This indicates that the video-output system processor 20 performs a process regarding light source lighting preparation while the entire control processor 10 performs a process for activating the OS 41, and, in this case, timings at which the entire control processor 10 and the video-output system processor 20 start and finish operations are not required to be synchronized with each other.

This is also the same as a case where the video-output system processor 20 displays an image based on image data included in control data transmitted from the entire control processor 10 according to a display setting of setting data in parallel to an operation of the entire control processor 10 activating the OS 41. This indicates that the video-output system processor 20 performs a process for displaying an image based on image data according to a display setting of setting data while the entire control processor 10 performs a process for activating the OS 41. Timings at which the entire control processor 10 and the video-output system processor 20 start and finish operations are not necessarily required to be synchronized with each other.

Along with an operation of the entire control processor 10 activating the OS 41, the video-output system processor 20 performs light source lighting preparation for lighting the light source portion 31 so as to emit light by lighting the light source of the light source portion 31 after the light source lighting preparation is completed. Therefore, the video-output system processor 20 can perform the operation of light source lighting preparation required to light the light source portion 31 while the entire control processor 10 activates the OS 41. Thus, it is possible to more efficiently reduce the time until a video can be displayed after the projector 1 is activated.

The entire control processor 10 transmits an instruction for light source lighting preparation in order to turn on the light source portion 31 to the video-output system processor 20 before activating the OS 41. The video-output system processor 20 performs light source lighting preparation for lighting the light source portion 31 on the basis of the instruction transmitted from the entire control processor 10, and lights the light source portion 31 after the light source lighting preparation is completed. Therefore, the video-output system processor 20 can perform the operation of light source lighting preparation required to light the light source portion 31 under the control of the entire control processor 10. Thus, in the configuration in which the entire control processor 10 controls the video-output system processor 20, it is possible to more efficiently reduce the time until a video can be displayed after the projector 1 is activated.

The parameters transmitted from the entire control processor 10 to the video-output system processor 20 include image data, and setting data related to display settings of the image data. The video-output system processor 20 displays an image based on image data included in control data transmitted from the entire control processor 10 according to a display setting of setting data in parallel to an operation of the entire control processor 10 activating the OS 41. Therefore, the video-output system processor 20 can perform processes including setting for displaying a video while the entire control processor 10 activates the OS 41, and thus it is possible to more efficiently reduce the time until a video can be displayed after the projector 1 is activated.

The video-output system processor 20 displays an image based on image data included in control data transmitted from the entire control processor 10 before the light source portion 31 starts to be lit, or after the light source portion 31 starts to be lit. The video-output system processor 20 displays an image before the light source portion 31 starts to be lit, or displays an image after the light source portion 31 starts to be lit. Thus, it is possible to rapidly display an image, or it is possible to display an image after a lighting state of the light source portion 31 is stabilized.

Second Embodiment

Figures 3A, 3B:
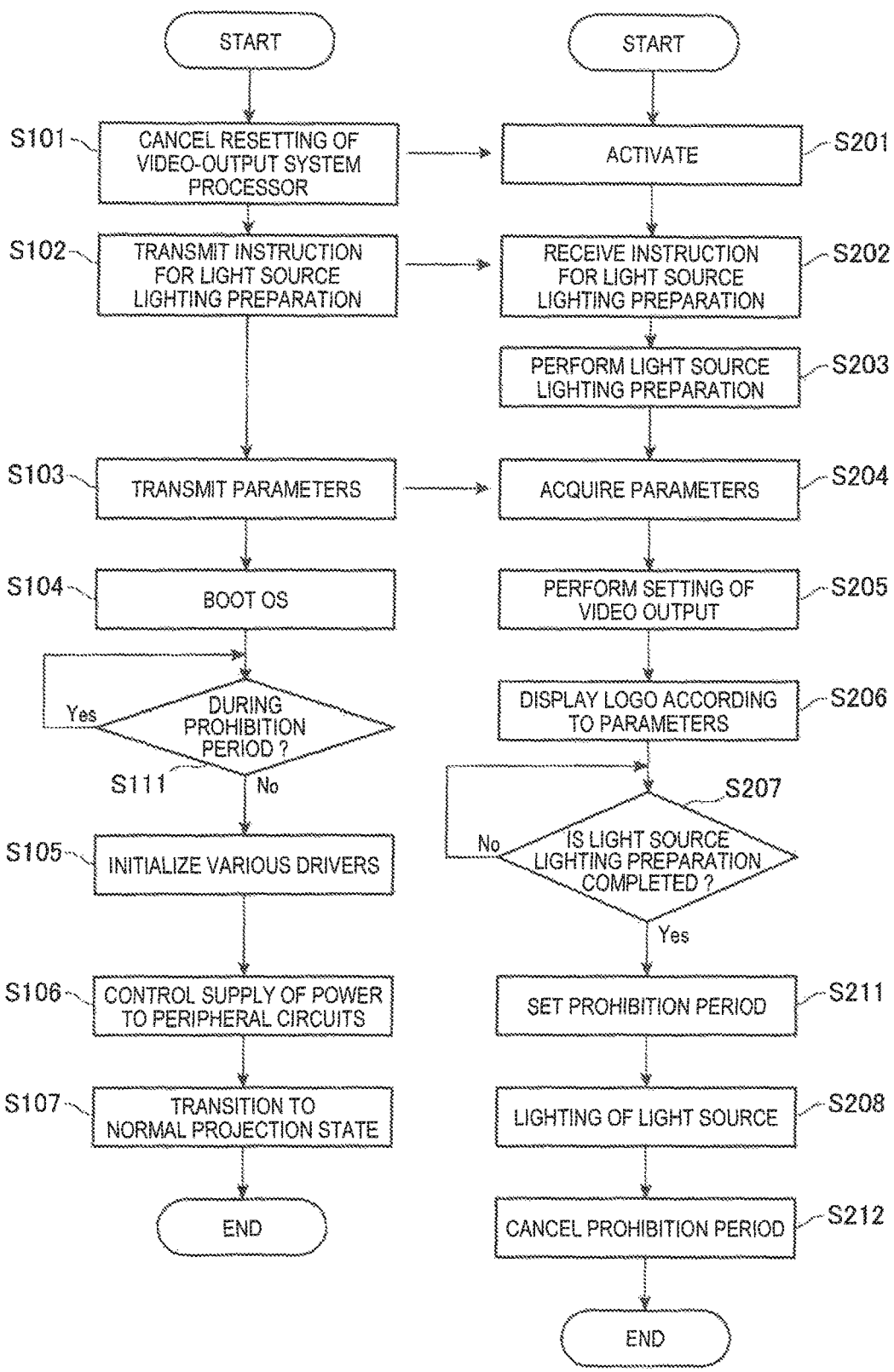

FIGS. 3A and 3B are flowcharts illustrating an operation of the projector 1 according to a second embodiment. FIG. 3A illustrates an operation of the entire control processor 10, and FIG. 3B illustrates an operation of the video-output system processor 20.

The second embodiment shows an operation example in a case where, in the above-described projector 1, the light source portion 31 is configured to include a discharge tube light source such as a xenon lamp or an ultra-high pressure mercury lamp. A configuration of the projector 1 in the second embodiment is the same as that in the above-described first embodiment, and thus the same reference numerals are used for the configuration of the projector 1 so that illustrations and description thereof will be omitted. In the flowchart illustrated in FIGS. 3A and 3B, processes which are common to those in FIGS. 2A and 2B are given the same step numbers, and description thereof will be omitted.

In the second embodiment, the light source portion 31 includes a discharge tube light source, and the light source driving unit 51 includes an igniter which lights the discharge tube light source, and a control circuit which supplies a current after the light source is lit. In a case where the light source portion 31 lights the discharge tube light source in a put-out state, as described above, there is the execution of a step in which high voltages are generated by the igniter, and the generated high voltages are made to overlap each other between lamp terminals so as to cause insulation breakdown, and a step in which a rush current is made to flow through the lamp terminals, and thus arc discharge occurs. In these steps (the above steps (1) and (2)), there is a possibility that noise may be generated from the discharge tube light source of the light source portion 31 and the circuit of the light source driving unit 51. Therefore, in order to avoid the influence of noise, the entire control processor 10 is set to stop input and output of data with each constituent element connected to the entire control processor 10 in a period in which the video-output system processor 20 performs the operations in the steps (1) and (2). This period is referred to as a stoppage period. In the stoppage period, the entire control processor 10 can process data written into the ROM 11 and the memory 12. On the other hand, in the stoppage period, the entire control processor 10 stops transmission and reception of data with, for example, the nonvolatile storage unit 40, the external apparatus I/F 65, the operation reception unit 63, and the video-output system processor 20.

In other words, in a case where it is determined that lighting can be performed (Yes in step S207), the video-output system processor 20 sets starting of a prohibition period of the entire control processor 10 (step S211). This prohibition period is a period in which the entire control processor 10 is prohibited from performing data communication with external devices, and corresponds to the above-described stoppage period. Thereafter, the entire control processor 10 performs the step in which high voltages are made to overlap each other between lamp terminals so as to cause insulation breakdown by the light source driving unit 51, and the step in which a rush current is made to flow through the lamp terminals, and thus arc discharge occurs. Therefore, the light source is lit (step S208). After the light source transitions to a stable lighting state, the video-output system processor 20 cancels the setting of the prohibition period for the entire control processor 10 (step S212), and finishes the present process.

The entire control processor 10 boots the OS 41 stored in the nonvolatile storage unit 40, and then determines whether or not the prohibition period is set (step S111). While the prohibition period is set (Yes in step S111), the entire control processor 10 waits. If the prohibition period is canceled, the entire control processor 10 initializes a driver program of each constituent element which is a control target of the entire control processor 10 (step S105), and controls the supply of power to peripheral circuits (step S106).

In the second embodiment, while the prohibition period is set, the entire control processor 10 stops processes related to transmission and reception of data with external devices, and is thus required to wait instead of performing the operations in steps S105 and S106, for example. However, as illustrated in FIG. 3A, a timing at which the entire control processor 10 waits in the prohibition period occurs after the OS 41 is booted in step S104.

In other words, the entire control processor 10 gives an instruction for light source lighting preparation before booting the OS 41 (step S102), and transmits the parameters to the video-output system processor 20 (step S103). In a case where the light source lighting preparation is completed, the video-output system processor 20 can light the light source (step S208). Therefore, the video-output system processor 20 lights the discharge tube light source of the light source portion 31 before the entire control processor 10 completes booting of the OS 41. Thus, the entire control processor 10 starts to boot the OS 41 at the time when the video-output system processor 20 sets the prohibition period, but booting is not completed, and thus there is a probability that a period in which a process of booting the OS 41 is performed may overlap the prohibition period. In a case where a scale of the OS 41 of the projector 1 is large, the time required for booting is long, and thus there is a considerably high probability that the period in which a process of booting the OS 41 is performed may overlap the prohibition period.

As mentioned above, in the second embodiment, the light source portion 31 is configured to include the discharge tube, and the prohibition period (stoppage period) in which at least some functions are stopped is set in the entire control processor 10 in a period in which the video-output system processor 20 lights the discharge tube of the light source portion 31. There is a high probability that the entire control processor 10 may perform a process of booting the OS 41 in the prohibition period, and the entire control processor 10 can perform a necessary process even in the prohibition period. In other words, since the prohibition period overlaps a period in which the entire control processor 10 activates the OS 41, and the entire control processor 10 performs processes which are not related to transmission and reception of data with external devices, useless waiting time hardly occurs. The video-output system processor 20 may perform setting in step S205, display a logo, and light the light source of the light source portion 31 without waiting for the entire control processor 10 to complete booting of the OS 41. Therefore, both of the entire control processor 10 and the video-output system processor 20 can perform an operation required to activate the projector 1 without waiting for completion of an operation of the other processor. Thus, it is possible to more efficiently reduce the time until a video can be displayed after the projector 1 is activated.

Third Embodiment

Figure 4:
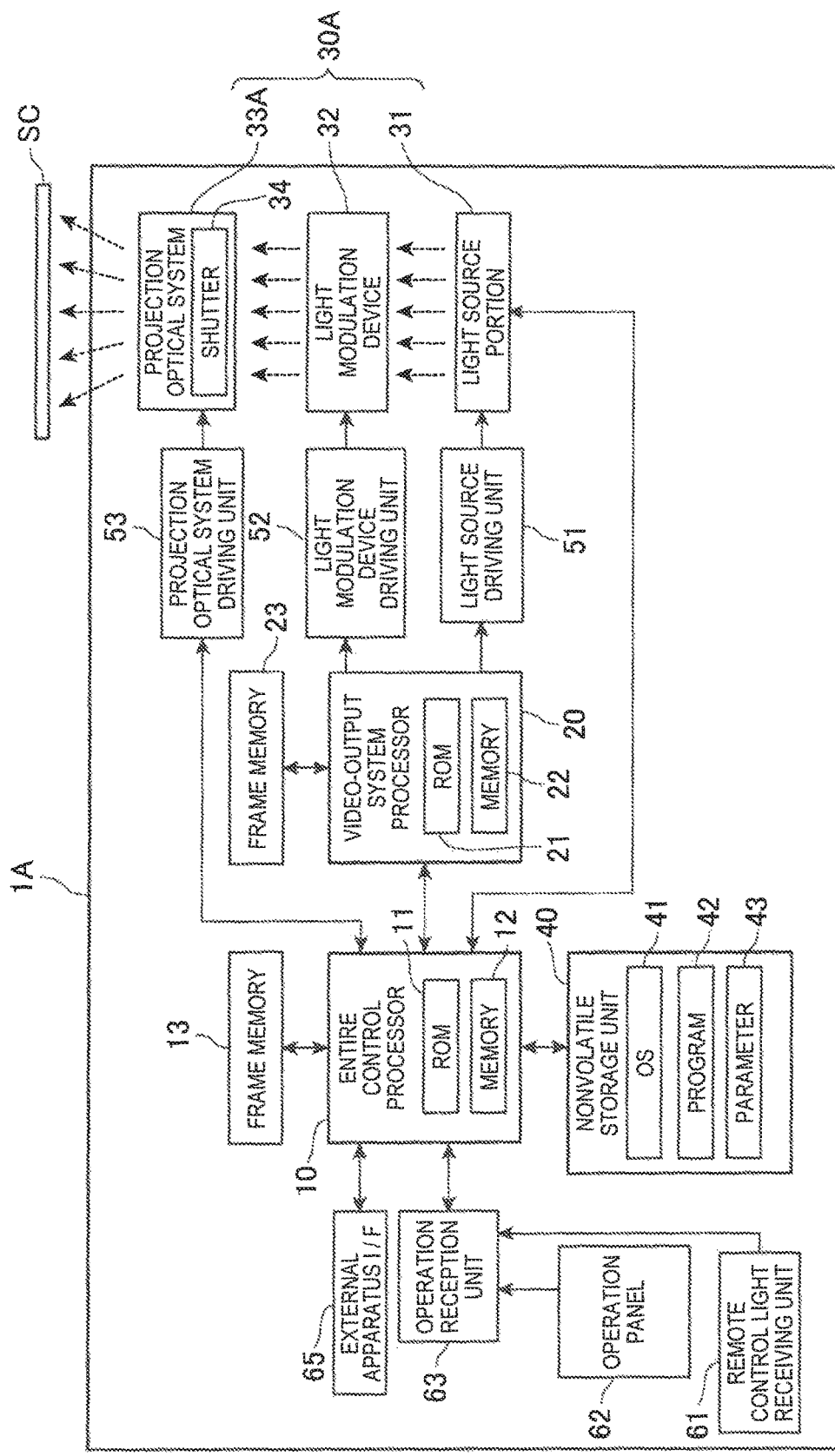
FIG. 4 is a functional block diagram of a projector according to a third embodiment.

FIG. 4 is a functional block diagram of a projector 1A (display apparatus) according to a third embodiment to which the invention is applied.

The projector 1A of the third embodiment has a configuration in which the projection optical system 33 of the projector 1 (FIG. 1) is replaced with a projection optical system 33A provided with a shutter 34. Other configurations are the same as those in the above-described first embodiment, and thus the same reference numerals are used for the configuration of the projector 1A so that illustrations and description thereof will be omitted.

Figures 5A, 5B:
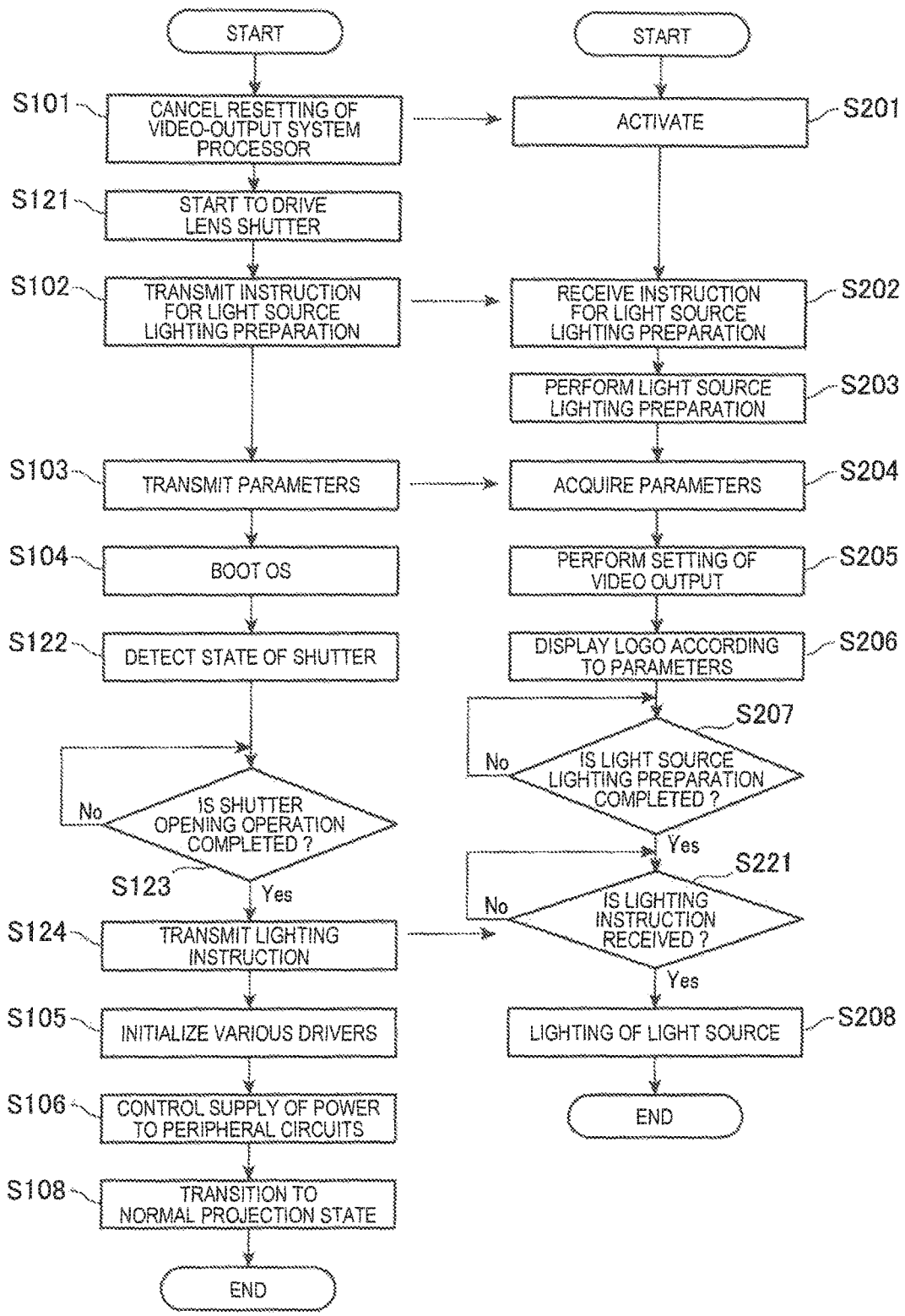

FIGS. 5A and 5B is a flowchart illustrating an operation of the projector 1A. FIG. 5A illustrates an operation of the entire control processor 10, and FIG. 5B illustrates an operation of the video-output system processor 20. In the flowchart illustrated in FIGS. 5A and 5B, processes which are common to those in FIGS. 5A and 5B in FIGS. 2A and 2B are given the same step numbers, and description thereof will be omitted.

The projector 1A includes a display unit 30A. The display unit 30A has a configuration in which the projection optical system 33 is replaced with the projection optical system 33A in the display unit 30 (FIG. 1). The projection optical system 33A includes the shutter 34 which blocks image light which is projected toward the screen SC. The shutter 34 may be provided at any position, and may be provided further toward the screen SC side than a lens group of the projection optical system 33A. Alternatively, the shutter 34 may be provided between the lens group of the projection optical system 33A and the light modulation device 32. The shutter 34 can be opened and closed by a motor (not illustrated) provided in the projection optical system driving unit 53. The projection optical system driving unit 53 is controlled by the entire control processor 10. In this case, the projection optical system driving unit 53 corresponds to a shutter driving unit.

The shutter 34 can be moved to an opening position at which image light is scarcely blocked, and a closing position at which image light is almost blocked. It cannot be expected in a normal use range that the shutter 34 is stopped at a position between the opening position and the closing position. Here, an operation of the projection optical system driving unit 53 moving the shutter 34 from the closing position to the opening position is referred to as an opening operation.

In the projector 1A, if the light source portion 31 is lit in a case where the shutter 34 is located at the closing position, the temperature of the display unit 30 increases over time, and may thus reach an upper limit of a normal use temperature range. In this case, the light source portion 31 is forced to be put out so that the apparatus can be protected, under the control of the entire control processor 10 or the video-output system processor 20. After the light source portion 31 is forced to be put out, typically, the light source portion 31 cannot be lit until the temperature decreases, thus a normal operation of the projector 1 has to be stopped, and this is inconvenient. Thus, in a case where a power-on operation is performed, the projector 1A performs the opening operation on the shutter 34 while the shutter 34 is located at the closing position, and controls the light source portion 31 not to be lit until the opening operation is completed.

The entire control processor 10 cancels resetting of the video-output system processor 20 (step S101), and then drives the motor of the projection optical system driving unit 53 so as to start the opening operation of the shutter 34 (step S121). Since the time for the opening operation of the shutter 34 is required, the entire control processor 10 transmits an instruction for light source lighting preparation to the video-output system processor 20 without waiting for completion of the opening operation after the opening operation is started (step S102).

The entire control processor 10 performs the operations in steps S103 to S104 described in the first embodiment.

On the other hand, the video-output system processor 20 performs the operations in steps S201 to S207 described in the first embodiment. In a case where it is determined that the light source lighting preparation is completed, and lighting of the light source portion 31 can be performed (Yes in step S207), the video-output system processor 20 waits for an instruction for lighting the light source to be received from the entire control processor 10 (step S221).

The entire control processor 10 gives an instruction for light source lighting preparation to the video-output system processor 20 in step S102, but, in the third embodiment, the video-output system processor 20 does not light the light source portion 31 even if the light source lighting preparation is completed. In order to realize this configuration, the entire control processor 10 may transmit not only an instruction for light source lighting preparation but also a command for instructing the video-output system processor 20 to wait without lighting the light source portion 31, to the video-output system processor 20, in step S102. Alternatively, a control program executed by the video-output system processor 20 may be set to wait for an instruction for light source lighting preparation after the light source lighting preparation is completed.

The entire control processor 10 detects a position of the shutter 34 after the OS 41 is activated. The entire control processor 10 determines whether or not the opening operation of the shutter 34 is completed (step S123). If the opening operation is not completed (No in step S123), the entire control processor 10 waits for the opening operation to be completed. In a case where it is determined that the opening operation is completed (Yes in step S123), the entire control processor 10 transmits an instruction for lighting the light source portion 31 to the video-output system processor 20 (step S124), and proceeds to step S105.

In a case where an instruction for lighting the light source portion 31 is not received from the entire control processor 10 (No in step S221), the video-output system processor 20 continuously waits for the instruction. In a case where the instruction for lighting the light source portion 31 is received (Yes in step S221), the video-output system processor 20 proceeds to step S208, so as to light the light source portion 31, and finishes the present process.

As mentioned above, the projector 1A of the third embodiment includes the shutter 34 which blocks light modulated by the light modulation device 32, and the projection optical system driving unit 53 which drives the shutter 34. The entire control processor 10 controls the projection optical system driving unit 53 to open the shutter 34, and the video-output system processor 20 lights the light source portion 31 after the shutter 34 is opened under the control of the entire control processor 10. Therefore, the entire control processor 10 can reduce the waiting time by adjusting a timing of performing a shutter opening operation, and can thus reduce the time until a video can be displayed after the projector 1 is activated.

The entire control processor 10 controls the projection optical system driving unit 53 to open the shutter 34 before activating the OS 41, and can thus perform the opening operation of the shutter 34 while the OS 41 is activated. Thus, it is possible to reduce the waiting time until the opening operation of the shutter 34 is completed, or to reduce the waiting time until the OS 41 is activated. Thus, it is possible to more efficiently reduce the time until a video can be displayed after the projector 1A is activated.

In the operations according to the third embodiment, illustrated in FIGS. 5A and 5B, in a case where the light source portion 31 includes a discharge tube light source, the operations shown in step S111 in FIG. 3A and the operations shown in steps S211 and S212 in FIG. 3B may be performed.

Each of the above-described embodiments shows a preferred embodiment of the invention, does not limit the invention, and may be variously modified within the scope without departing from the spirit of the invention.

For example, in the above-described embodiments, a description has been made of a configuration in which the entire control processor 10 and the video-output system processor 20 are respectively connected to the frame memories 13 and 23, but the invention is not limited thereto. For example, there may be provided a single frame memory on which both of the entire control processor 10 and the video-output system processor 20 can perform writing and reading.

There may be a configuration in which some of the parameters 43 used by the video-output system processor 20 may be written into the ROM 21 in advance. In this case, the ROM 21 may be a rewritable EEPROM or the like. For example, among the various values included in the parameters 43, fixed values may be written into the ROM 21 depending on specifications or characteristics of the projectors 1 and 1A. The parameters 43 stored in the nonvolatile storage unit 40 may be updated as appropriate under the control of the entire control processor 10.

In the above-described respective embodiments, the entire control processor 10 may detect states or the like of the light source driving unit 51 and the light modulation device driving unit 52 which are control targets of the video-output system processor 20.

In the above-described respective embodiments, in a case where the operation reception unit 63 receives an operation of giving an instruction for turning on the power source, the entire control processor 10 cancels resetting of the video-output system processor 20. The configuration in which the entire control processor 10 cancels resetting of the video-output system processor 20 is not essential. For example, resetting of the video-output system processor 20 may be canceled before a power-on operation is performed.

A display apparatus to which the invention is applied has been described as a projector using the light modulation device 32 provided with transmissive liquid crystal panels, reflective liquid crystal panels, or DMDs, but any configuration of a modulation device generating image light in the projectors 1 and 1A may be employed. A display apparatus to which the invention is applied is not limited to a projector which projects an image onto the screen SC. For example, a display apparatus may be a liquid crystal monitor or a liquid crystal television set which displays an image on a liquid crystal panel, or may be a monitor apparatus or a television receiver which displays an image on a plasma display panel (PDP). For example, the invention may be applied to self-emission type display apparatuses such as a monitor apparatus or a television receiver which displays an image on an organic EL display panel called an organic light-emitting diode (OLED) or organic electroluminescence (OEL).

Each functional constituent element of the projectors 1 and 1A illustrated in FIGS. 1 and 4 indicates a functional configuration realized in cooperation between hardware and software, and thus a specific mounting aspect is not particularly limited. Therefore, individually corresponding hardware is not necessarily required to be mounted in each functional constituent element, and a single processor may be configured to realize functions of a plurality of functional constituent elements by executing a program. In the above-described embodiments, some functions realized by software may be realized by hardware, or some functions realized by hardware may be realized by software. Detailed configurations of other constituent elements of the projectors 1 and 1A may be changed as appropriate within the scope without departing from the spirit of the invention.

What is claimed is:

1. A display apparatus comprising:
a light source;
a modulation device that modulates light from the light source;
a first processor that controls an operation of the display apparatus by executing an operating system;
a second processor that is operable in parallel to the first processor, and controls the light source and the modulation device; and
a storage unit that stores control data processed by the second processor,
wherein the first processor transmits the control data stored in the storage unit to the second processor before activating the operating system.

2. The display apparatus according to claim 1,
wherein the second processor controls the light source and the modulation device on the basis of the control data transmitted from the first processor in parallel to an operation of the first processor activating the operating system.

3. The display apparatus according to claim 1,
wherein the second processor performs light source preparation for causing the light source to emit light, and causes the light source to emit light after the light source preparation is completed, in parallel to an operation of the first processor activating the operating system.

4. The display apparatus according to claim 3,
wherein the light source is configured to include a discharge tube, and
wherein a stoppage period in which some functions of the first processor are stopped in a period of the second processor lighting the discharge tube of the light source is set in the first processor, and the stoppage period overlaps a period of performing a process of activating the operating system.

5. The display apparatus according to claim 3,
wherein the control data includes image data, and setting data related to display settings of the image data, and
wherein the second processor displays an image based on the image data included in the control data transmitted from the first processor according to display settings in the setting data in parallel to an operation of the first processor activating the operating system.

6. The display apparatus according to claim 5,
wherein the second processor displays an image based on the image data included in the control data transmitted from the first processor before the light source starts to emit light or after the light source starts to emit light.

7. The display apparatus according to claim 3, further comprising:
a shutter that blocks light modulated by the modulation device; and
a shutter driving unit that drives the shutter,
wherein the first processor controls the shutter driving unit to open the shutter, and
wherein the second processor causes the light source to emit light after the shutter is opened under the control of the first processor.

8. The display apparatus according to claim 7,
wherein the first processor controls the shutter driving unit to open the shutter before activating the operating system.

9. The display apparatus according to claim 1,
wherein the first processor transmits an instruction for light source preparation for causing the light source to emit light to the second processor before activating the operating system, and
wherein the second processor performs the light source preparation for causing the light source to emit light on the basis of the instruction transmitted from the first processor, and causes the light source to emit light after the light source preparation is completed.

10. A control method for a display apparatus including a light source, and a modulation device that modulates light from the light source, the control method comprising:

causing a first processor to transmit control data to be processed by a second processor from a storage unit to the second processor before activating an operating system of the first processor, the first processor controlling an operation of the display apparatus by executing the operating system, the second processor being operable in parallel to the first processor and controlling the light source and the modulation device.

\* \* \* \* \*